United States Patent
Shen et al.

(10) Patent No.: US 11,469,817 B2
(45) Date of Patent: Oct. 11, 2022

(54) PROTECTION METHOD AND SYSTEM AGAINST FAILURE OF AI-BASED QOT PREDICTION

(71) Applicant: SOOCHOW UNIVERSITY, Suzhou (CN)

(72) Inventors: Gangxiang Shen, Suzhou (CN); Ningning Guo, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 154 days.

(21) Appl. No.: 17/058,869

(22) PCT Filed: Dec. 15, 2019

(86) PCT No.: PCT/CN2019/128300
§ 371 (c)(1),
(2) Date: Nov. 25, 2020

(87) PCT Pub. No.: WO2021/114402
PCT Pub. Date: Jun. 17, 2021

(65) Prior Publication Data
US 2021/0367666 A1 Nov. 25, 2021

(30) Foreign Application Priority Data
Dec. 13, 2019 (CN) .......................... 201911282911.7

(51) Int. Cl.
*H04B 10/08* (2006.01)
*H04B 10/079* (2013.01)

(52) U.S. Cl.
CPC ... *H04B 10/07953* (2013.01); *H04B 10/0791* (2013.01); *H04B 10/0793* (2013.01)

(58) Field of Classification Search
CPC ........ H04B 10/07953; H04B 10/07955; H04B 10/07957; H04B 10/0793; H04B 10/0795;
(Continued)

(56) References Cited

U.S. PATENT DOCUMENTS 10,177,843 B2  1/2019  Yamauchi et al.
2013/0044621 A1  2/2013  Jung et al.
(Continued)

FOREIGN PATENT DOCUMENTS

CN  107623548 A  1/2018
CN  108966687 A  12/2018

*Primary Examiner* — Hanh Phan
(74) *Attorney, Agent, or Firm* — SZDC Law P.C.

(57) ABSTRACT

The invention provides a protection method against failure of AI-based QoT prediction, comprising calculating a first number of frequency slots and a consumable margin for a working lightpath that meet the traffic demand according to a method for allocating an OSNR margin for a working lightpath; calculating a second number of frequency slots and a consumable margin for the protection lightpath that meet the traffic demand according to a method for allocating an OSNR margin for the protection lightpath; and evaluating utilization of spectrum resource based on the first number of frequency slots and the second number of frequency slots and evaluating reliability of lightpath based on the consumable margin for the working lightpath. The method of the invention is more stable in practical network applications.

10 Claims, 6 Drawing Sheets

(58) Field of Classification Search
CPC . H04B 10/032; H04B 10/035; H04J 14/0293; H04J 14/0294; H04J 14/0287; H04Q 11/0003; H04Q 11/0005; H04Q 11/0066; H04Q 11/0067
USPC ........ 398/25, 26, 27, 33, 38, 45, 46, 48, 49, 398/50, 51, 53, 54, 55, 56, 59, 79, 2, 3, 398/4, 5, 7, 8, 57
See application file for complete search history.

(56) References Cited

U.S. PATENT DOCUMENTS

2014/0328587 A1\* 11/2014 Magri .................... H04L 45/62
398/34
2015/0162980 A1\* 6/2015 Cavaliere ............... H04J 14/02
398/26

\* cited by examiner

PROTECTION METHOD AND SYSTEM AGAINST FAILURE OF AI-BASED QOT PREDICTION

This application is the National Stage Application of PCT/CN2019/128300, filed on Dec. 15, 2019, which claims priority to Chinese Patent Application No. 201911282911.7, filed on Dec. 13, 2019, which is incorporated by reference for all purposes as if fully set forth herein.

FIELD OF THE INVENTION

The present invention relates to the field of communication technology, and more particularly, to a protection method and system against failure of artificial-intelligence-based (AI-based) quality-of-transmission (QoT) prediction.

DESCRIPTION OF THE RELATED ART

During prediction of the Quality of Transmission (QoT) of a lightpath, more accurate prediction can be achieved through Artificial Intelligence (AI) than with a traditional method. This helps reduce the optical signal to noise ratio (OSNR) margin set for a lightpath in an optical network and effectively improves utilization of network resources. However, many AI-based prediction methods are based on data only from laboratory tests in a stable known environment. Therefore, such AI-based QoT prediction presents a high risk of failure, which causes the problem of instability in practical network applications.

SUMMARY OF THE INVENTION

In view of this, the present invention is intended to address the problem of high failure of AI-based QoT prediction causing instability in practical network applications, and provides a protection method and system against failure of AI-based QoT prediction that have a low failure rate and are stable in practical network applications.

To address the above technical problem, the present invention provides a protection method against failure of AI-based QoT prediction, including: a method for allocating an Optical Signal to Noise Ratio (OSNR) margin for a working lightpath and a method for allocating an OSNR margin for a protection lightpath. A first number of frequency slots and a consumable margin for the working lightpath that meet the traffic demand are calculated according to the method for allocating an OSNR margin for the working lightpath. A second number of frequency slots and a consumable margin for the protection lightpath that meet the traffic demand are calculated according to the method for allocating an OSNR margin for the protection lightpath. Utilization of spectrum resource is evaluated based on the first number of frequency slots and the second number of frequency slots and reliability of lightpath is evaluated based on the consumable margin for the working lightpath.

In an embodiment of the present invention, the reliability of lightpath service is evaluated based on both the consumable margin for the working lightpath and the consumable margin for the protection lightpath.

In an embodiment of the present invention, the utilization of lightpath is evaluated based on both the first number of frequency slots and the second number of frequency slots.

In an embodiment of the present invention, the reliability of lightpath service is calculated in the expression of $R_{lp}=1-F_w \cdot F_p$, where $F_w$ and $F_p$ are respectively the failure rate of the working lightpath and the failure rate of the protection lightpath.

In an embodiment of the present invention, the method for allocating an OSNR margin for a working lightpath includes calculating the OSNR of the lightpath by using channel parameters; during signal transmission, increasing the error value by one random Gaussian distribution each time passing through a link to produce real actual data through simulation; building an OSNR model through artificial neural network training to predict the OSNR of the lightpath; and calculating the first number of frequency slots and the consumable margin for the working lightpath that meet the traffic demand based on the OSNR.

In an embodiment of the present invention, the first number of frequency slots and the consumable margin for the working lightpath are calculated in the expressions of $$FEC_{limit}+U_{margin} \leq OSNR_{lightpath}-S_{margin}=OSNR_{lightpath}-4.7\ dB$$

$$U_{margin} \leq OSNR_{lightpath}-4.7\ dB-FEC_{limit}$$

where $FEC_{limit}$ is the forward error correction coding limit, $U_{margin}$ and $S_{margin}$ are respectively unallocated margins and system margins, and $OSNR_{lightpath}$ is the OSNR value of the lightpath.

In an embodiment of the present invention, the channel parameters include the number of hops of the lightpath, the total length of the lightpath, the length of the longest link of the lightpath, total amplified spontaneous emission noises of all the lightpaths, total non-linear interferences of all the lightpaths, and the number of optical amplifiers on the lightpath.

In an embodiment of the present invention, the method for allocating an OSNR margin for the protection lightpath includes: calculating the OSNR of the lightpath by using the channel parameters; and calculating the second number of frequency slots and the consumable margin for the protection lightpath that meet the traffic demand based on the OSNR.

In an embodiment of the present invention, the second number of frequency slots and the consumable margin for the protection lightpath are calculated in the expressions of $$FEC_{limit}+U_{margin} \leq OSNR_{lightpath}-D_{margin}-S_{margin}=OSNR_{lightpath}-6.7\ dB$$

$$U_{margin} \leq OSNR_{lightpath}-6.7\ dB-FEC_{limit}$$

where $FEC_{limit}$ is the forward error correction coding limit, $U_{margin}$, $D_{margin}$ and $S_{margin}$ are respectively unallocated margins, design margins and system margins, and $OSNR_{lightpath}$ is the OSNR value of the lightpath.

The present invention further provides a protection system against failure of AI-based QoT prediction, including a system for allocating an OSNR margin for the working lightpath and a system for allocating an OSNR margin for the protection lightpath. The system for allocating an OSNR margin for the working lightpath is configured to calculate a first number of frequency slots and a consumable margin for the working lightpath that meet the traffic demand. The system for allocating an OSNR margin for the protection lightpath is configured to calculate a second number of frequency slots and a consumable margin for the protection lightpath that meet the traffic demand. Utilization of spectrum resource is evaluated based on the first number of frequency slots and the second number of frequency slots, and reliability of lightpath is evaluated based on the consumable margin for the working lightpath.

As compared with the prior art, the technical solutions of the present invention as described above have the following advantages.

The protection method and system against failure of AI-based QoT prediction according to the present invention include the method for allocating an OSNR margin for the working lightpath and the method for allocating an OSNR margin for the protection lightpath. Even if prediction according to the method for allocating an OSNR margin for the working lightpath fails, network service can be resumed in time according to the method for allocating an OSNR margin for the protection lightpath. Also, a first number of frequency slots and a consumable margin for the working lightpath that meet the traffic demand are calculated according to the method for allocating an OSNR margin for the working lightpath. A second number of frequency slots and a consumable margin for the protection lightpath that meet the traffic demand are calculated according to the method for allocating an OSNR margin for the protection lightpath. Utilization of spectrum resource is evaluated based on the first number of frequency slots and the second number of frequency slots, and reliability of lightpath is evaluated based on the consumable margin for the working lightpath, so that failure of prediction according to the method for allocating an OSNR margin for the working lightpath can be effectively prevented, and as such this method is more stable in practical network applications. Furthermore, the method for allocating an OSNR margin for the working lightpath has the advantage of a lower OSNR margin, thereby ensuring efficient utilization of spectrum resource.

BRIEF DESCRIPTION OF THE DRAWINGS

To make the present invention easier to be clearly understood, the present invention will be further explained in detail according to specific embodiments of the present invention in combination to the accompanying drawings, in which.

DETAILED DESCRIPTION OF THE PREFERRED EMBODIMENTS

Embodiment 1

Figure 1:
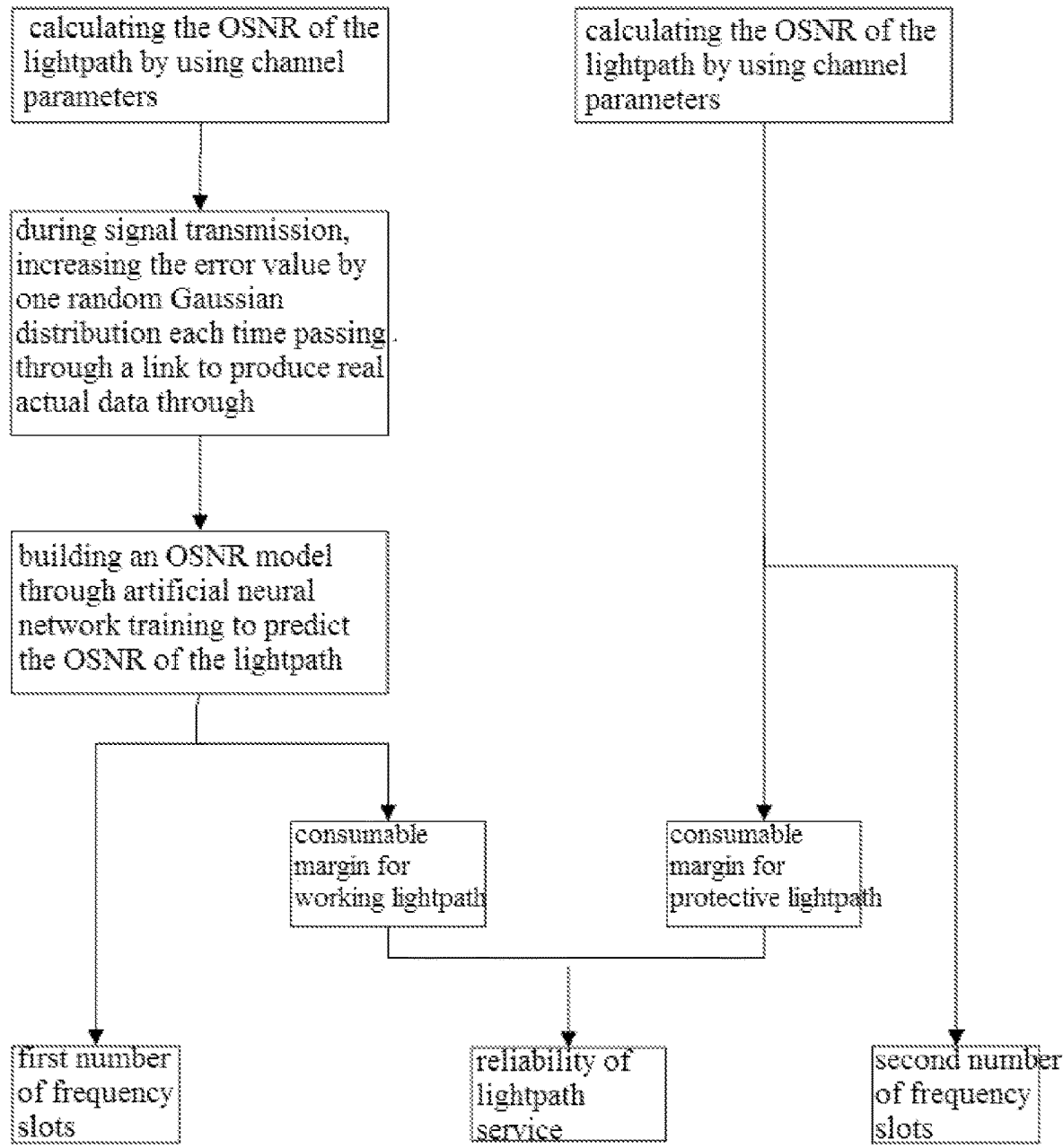
FIG. 1 is a flow diagram of a protection method against failure of AI-based QoT prediction according to the present invention.

As shown in FIG. 1, this embodiment provides a protection method against failure of AI-based QoT prediction, including: a method for allocating an OSNR margin for a working lightpath and a method for allocating an OSNR margin for a protection lightpath, in which a first number of frequency slots and a consumable margin for the working lightpath that meet the traffic demand are calculated according to the method for allocating an OSNR margin for the working lightpath; a second number of frequency slots and a consumable margin for the protection lightpath that meet the traffic demand are calculated according to the method for allocating an OSNR margin for the protection lightpath; and utilization of spectrum resource is evaluated based on the first number of frequency slots and the second number of frequency slots and reliability of lightpath is evaluated based on the consumable margin for the working lightpath.

The protection method against failure of AI-based QoT prediction according to this embodiment includes the method for allocating an OSNR margin for the working lightpath and the method for allocating an OSNR margin for the protection lightpath, in which the method for allocating an OSNR margin for the working lightpath is an AI-based prediction method. Even if prediction according to the method for allocating an OSNR margin for the working lightpath fails, network service can be resumed in time according to the method for allocating an OSNR margin for the protection lightpath. Also, a first number of frequency slots and a consumable margin for the working lightpath that meet the traffic demand are calculated according to the method for allocating an OSNR margin for the working lightpath, a second number of frequency slots and a consumable margin for the protection lightpath that meet the traffic demand are calculated according to the method for allocating an OSNR margin for the protection lightpath, and utilization of spectrum resource is evaluated based on the first number of frequency slots and the second number of frequency slots and reliability of lightpath is evaluated based on the consumable margin for the working lightpath, so that failure of prediction according to the method for allocating an OSNR margin for the working lightpath can be effectively prevented, and as such this method is more stable in practical network applications. Furthermore, the method for allocating an OSNR margin for the working lightpath has the advantage of a lower OSNR margin, thereby ensuring efficient utilization of spectrum resource.

According to the present invention, reliability of lightpath service is evaluated based on both the consumable margin for the working lightpath and the consumable margin for the protection lightpath, and utilization of lightpath is evaluated based on both the first number of frequency slots and the second number of frequency slots. The manner of evaluation of reliability and utilization of lightpath service shall be explained in detail below.

In calculating the OSNR of a lightpath, two aspects are generally considered, i.e., optical amplifier amplified spontaneous emission (ASE) noise and non-linear interference (NLI). For the ASE noise, in the present invention, an NF corresponding to the amplifier gain is found by means of a Gain-Noise Figure (NF) table, specifically pre-built based on amplifier types. For the NLI, in the present invention, a closed-form approximate solution of an Incoherent Gaussian Noise (IGN) model is employed. Based on the calculated OSNR, three types of OSNR margins are typically set for a lightpath, including system margins, unallocated margins and design margins. The system margins account for varying network operating conditions, which include fast varying penalties, slow aging, and nonlinearities. The unallocated margins refer to the difference of capacity between the signal demand and the network equipment. The design margins account for the accuracy of the design tool for evaluating QoT.

The method for allocating an OSNR margin for the protection lightpath, referred to as the traditional method, is explained below in detail.

The OSNR of the lightpath is calculated by using the channel parameters, and the second number of frequency slots and the consumable margin for the protection lightpath that meet the traffic demand are calculated based on the OSNR.

Figure 2:
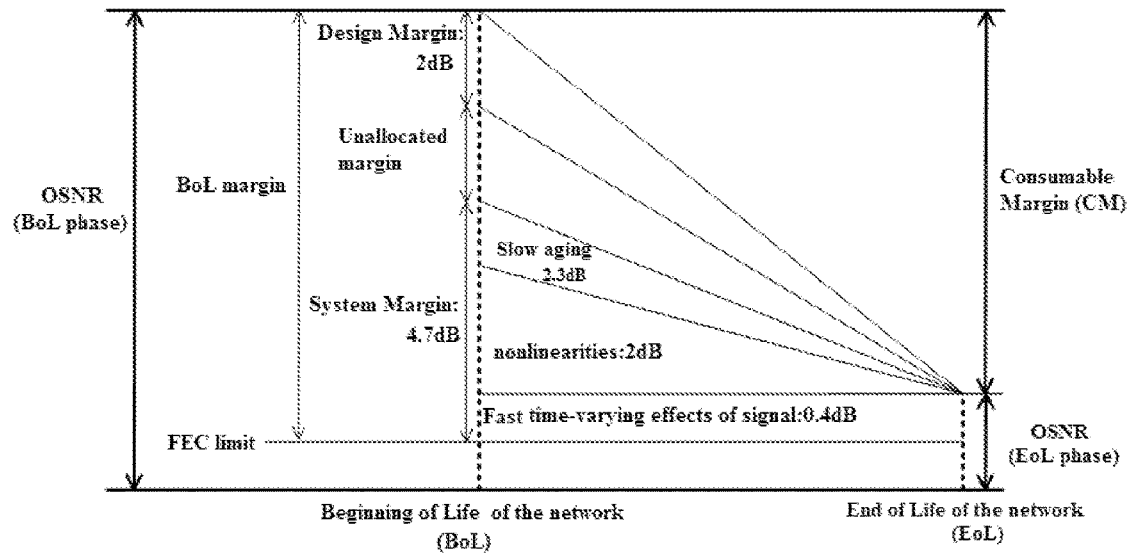
FIG. 2 is a schematic view showing the settings for allocating an OSNR margin for a protection lightpath according to the present invention.

In the method described above, both the system margins and the design margins are considered. As shown in FIG. 2, it is assumed that at the Beginning of Life (BoL) of the network, the nonlinear OSNR margin is 2 dB, the margin for the slow aging of the fiber optic equipment is 2.3 dB, and the fast time-varying effects of signal is 0.4 dB, which suggests that the system margin is 2+2.3+0.4=4.7 dB, and also it is assumed that the design margin at this time is 2 dB. Based on the above assumption of the margins, the OSNR needed for each lightpath can be calculated, and a modulation format is selected according to an expression. Specifically, the second number of frequency slots and the consumable margin for the protection lightpath are calculated in the expressions of $$FEC_{limit}+U_{margin} \leq OSNR_{lightpath}-D_{margin}-S_{margin}=OSNR_{lightpath}-6.7 \text{ dB} \quad (1)$$

$$U_{margin} \leq OSNR_{lightpath}-6.7 \text{ dB}-FEC_{limit} \quad (2)$$

where $FEC_{limit}$ is the forward error correction coding limit, $U_{margin}$, $D_{margin}$ and $S_{margin}$ are respectively unallocated margins, design margins and system margins, and $OSNR_{lightpath}$ is the OSNR value of the lightpath.

The method for allocating an OSNR margin for the working lightpath, referred to as the AI-based prediction method, is explained below in detail.

The OSNR of the lightpath is calculated by using channel parameters; during signal transmission, the error value is increased by one random Gaussian distribution each time passing through a link to produce real actual data through simulation; an OSNR model is built through artificial neural network training to predict the OSNR of the lightpath; and the first number of frequency slots and the consumable margin for the working lightpath that meet the traffic demand are calculated based on the OSNR.

Figure 3:
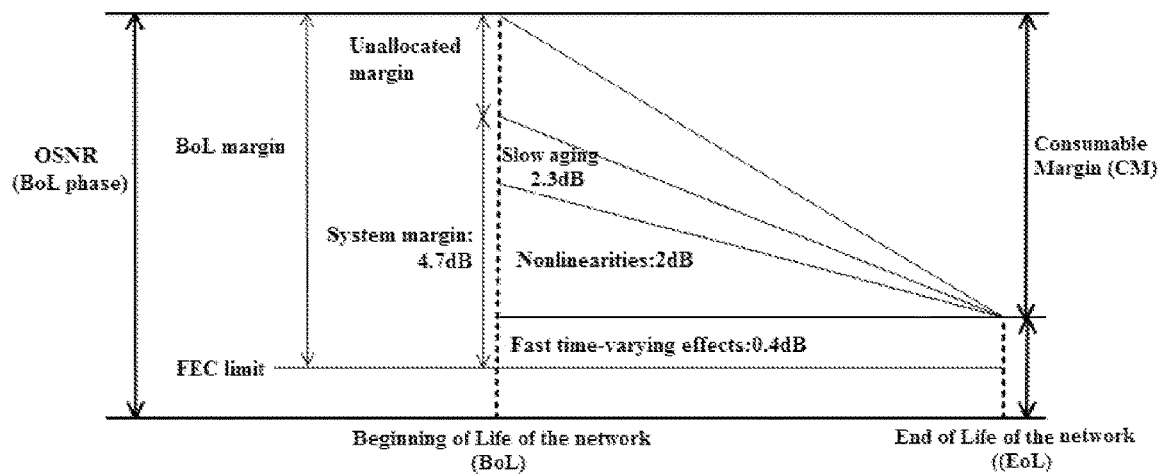
FIG. 3 is a schematic view showing the settings for allocating an OSNR margin for a working lightpath according to the present invention.

In the method described above, the system margin at the beginning of life of the network is still set to 4.7 dB. As shown in FIG. 3, since AI-based OSNR prediction can evaluate the QoT of the lightpath more accurately, the design margin can be significantly lowered or even omitted. In this study, the design margin is set to 0 in the present application. For accurate OSNR prediction, sufficient data is needed for AI training. Since it is difficult to collect enough actual network data, data is simulated by calculating the OSNRs for all the routes in the Elastic Optical Network (EON) in the present application. To simulate a network's statistical feature, a Gaussian error of a maximum of ±0.3 dB is added in the Nonlinear Interference (NLI) in the present application. By means of this method, the OSNR values of the lightpath between each node pair in the network are calculated, and these values are utilized as the training data for the Artificial Neural Network (ANN). This simulation of training data will not affect the effectiveness of the method proposed by the present application, because if sufficient actual data can be collected to replace such simulated data, no other steps need to be modified. In addition, the Artificial Neural Network (ANN) for training has a plurality of input neurons, i.e. the channel parameters, including the number of hops of the lightpath, the total length of the lightpath, the length of the longest link of lightpath, total amplified spontaneous emission noises of all the lightpaths, total nonlinear interferences of all the lightpaths, and the number of optical amplifiers on the lightpath.

Through training, an AI-based OSNR prediction model can be obtained. Based on the predicted OSNR, the most efficient modulation format is selected by using the following expression while ignoring the design margin (2 dB). Specifically, the first number of frequency slots and the consumable margin for the working lightpath are calculated in the expressions of $$FEC_{limit}+U_{margin} \leq OSNR_{lightpath}-S_{margin}=OSNR_{lightpath}-4.7 \text{ dB} \quad (3)$$

$$U_{margin} \leq OSNR_{lightpath}-4.7 \text{ dB}-FEC_{limit} \quad (4)$$

where $FEC_{limit}$ is the forward error correction coding limit, $U_{margin}$ and $S_{margin}$ are respectively unallocated margins and system margins and $OSNR_{lightpath}$ is the OSNR value of the lightpath.

Figure 4:
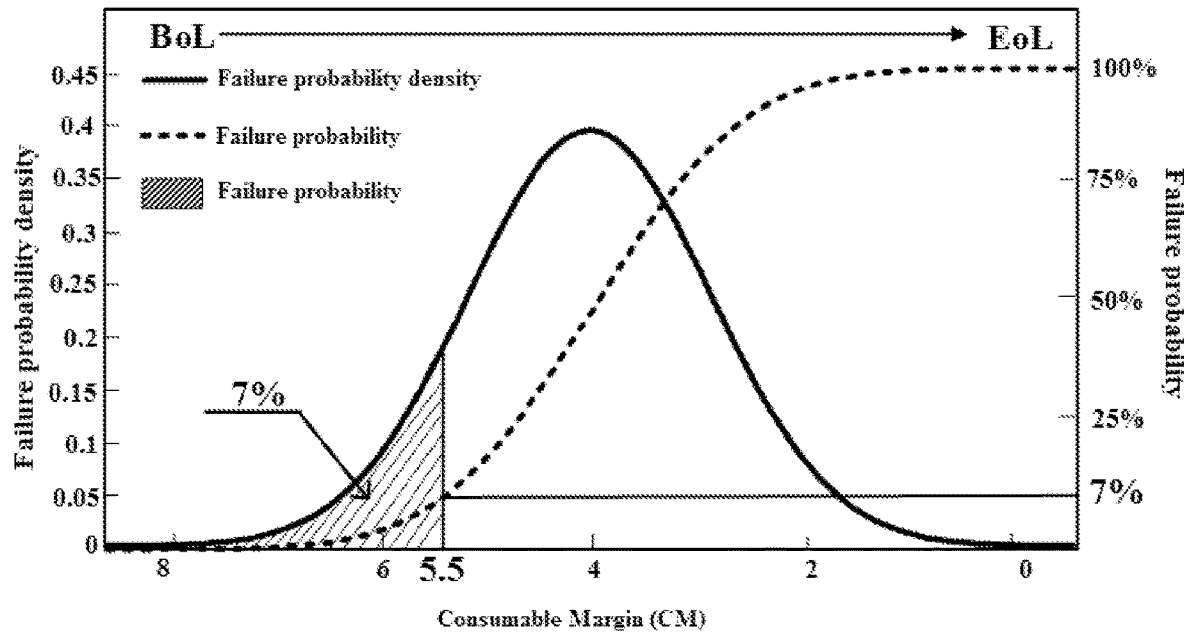
FIG. 4 shows the relation between the consumable margin and the failure probability according to the present invention.

At the beginning of life of the lightpath, the actual OSNR is the sum of the Forward Error Correction Coding (FEC) limit and the total margins set including three margins. At this time, the transmission quality of the lightpath is optimum, and the failure rate is the lowest, approximately 0. At the End of Life (EoL) of the lightpath, when the OSNR value is less than the sum of the FEC limit and the system margin for the fast time-varying effects, the lightpath service fails, at which point the failure rate is 1. In the present application, the difference between margins at the BoL phase (beginning of life of the network) and the EoL phase (end of life of the network) is defined as the Consumable Margin (CM) for the lightpath, which is the lightpath total margin $T_{margin}$ minus the fast time-varying system margin $F_{margin}$, i.e., $CM=T_{margin}-F_{margin}$. Based on the value of Consumable Margin (CM) for the lightpath calculated as described above, the transmission failure rate of the lightpath is evaluated based on the Gaussian distribution shown in FIG. 4, where the shaded area represents the integral of the probability density function of the failure rate.

Figure 5:
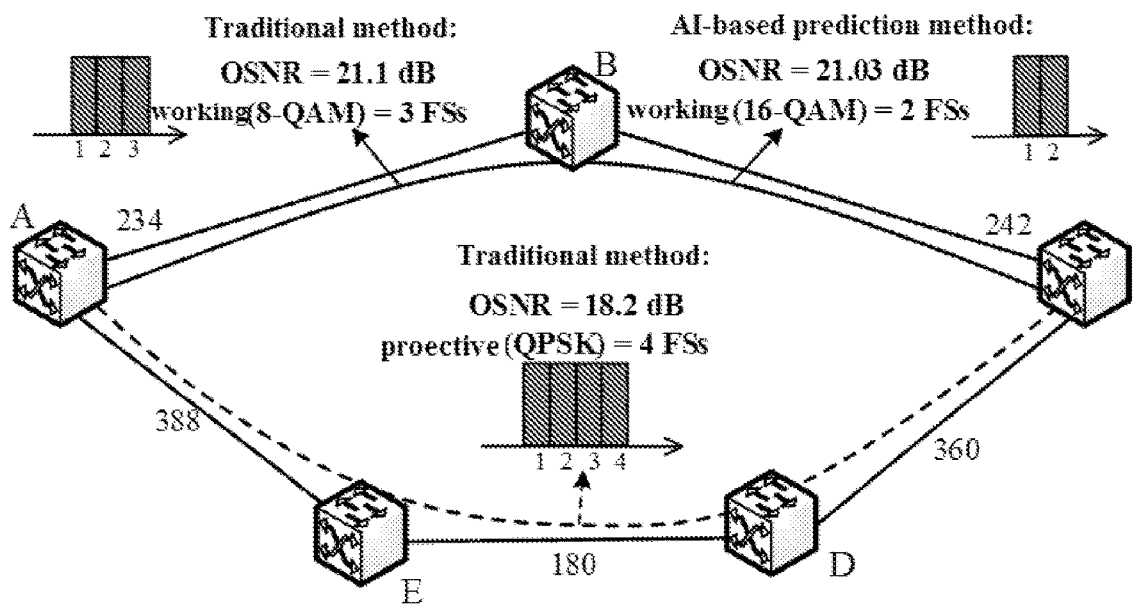
FIG. 5 shows an example of protection in the case of failure of AI-based OSNR prediction according to the present invention.
Figure 6:
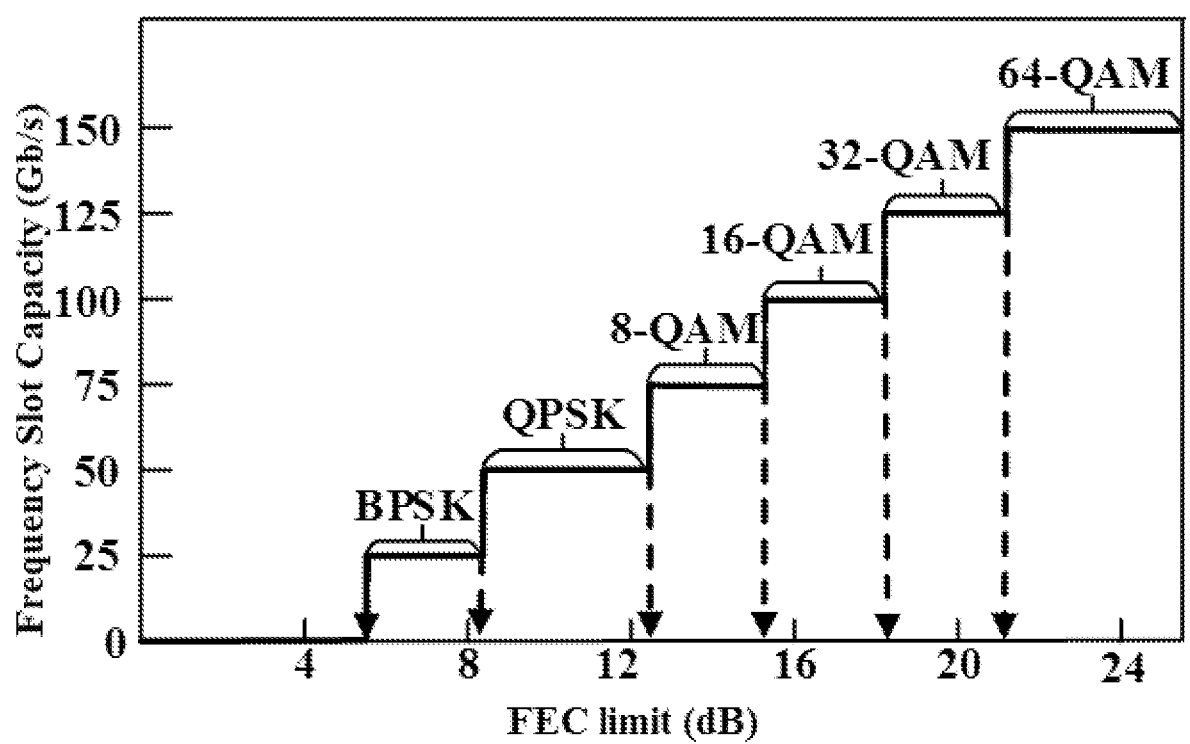
FIG. 6 is a graph showing the relation between the frequency slot capacity and the FEC limit according to the present invention.

As shown in FIG. 5, it assumed that the traffic demand between node pairs A-C in a pair is 180 Gb/s, and the shortest path A-B-C is found as the working lightpath. First the OSNR value of the working lightpath calculated based on the channel parameters is 21.1 dB. Under the traditional margin setting method, both the system margin and the design margin need to be considered, which totals to 4.7+2=6.7 dB. According to the expression (1), calculation of $FEC_{limit}+U_{margin} \leq 14.4$ dB, where 21.1−6.7=14.4 dB, can be made. Then, as shown in FIG. 6, as the FEC limit is within the range of [12.43, 15.13] dB, 8-QAM is selected accordingly as the modulation format. In such a modulation format, 3 frequency slots need to be reserved for the links A-B and B-C to meet the traffic demand (where when FEC limit corresponds to 8-QAM, the corresponding frequency slot capacity is 75 GB/s, at which point the traffic demand between the nodes A-C divided by the value corresponding to the frequency slot capacity is the value of frequency slot that needs to be reserved, i.e., 180/75=2.4, which means approximately 3 frequency slots). The unallocated margin can be further calculated as 14.4−12.43=1.97 dB according to the expression (2). As the fast time-varying effects of the signal is 0.4 dB, then a Consumable Margin (CM) value is calculated as 2+1.97+4.7−0.4=8.27 dB according to FIG. 2. Therefore, according to the failure curve shown in FIG. 4, at the Beginning of Life (BoL) of the network, the failure rate of the working lightpath is approximately 0 at this time.

In the AI-based method for predicting the OSNR value of lightpath, the OSNR value of the working lightpath is calculated as 21.03 dB based on the channel parameters. At this time, without considering the design margin, $FEC_{limit}+U_{margin} \leq 16.33$ dB (at this time, 21.03−4.7=16.33 dB) can be calculated according to the expression (3). Then, as shown in FIG. 6 below, as the FEC limit is within the range of [15.13, 18.11] dB, 16-QAM is selected accordingly as the modulation format. Using this modulation format, 2 frequency slots should be reserved on the link A-B and the link B-C, where when the FEC limit corresponds to 16-QAM, the frequency slot capacity is accordingly 100 GB/s, at which point the value corresponding to the traffic demand between the nodes A-C divided by the frequency slot capacity is the value of frequency slot that needs to be reserved, i.e., 180/100=1.8, which means 2 frequency slots). In this setting condition, the unallocated margin is further calculated as 16.33−15.13=1.2 dB. As the fast time-varying effect of signal is 0.4 dB, the Consumable Margin (CM) value is then calculated as 1.2+4.7−0.4=5.5 dB accordingly according to FIG. 3. Therefore, according to the failure curve in FIG. 4, at the Beginning of Life (BoL) of the network, the failure rate of the working lightpath is approximately 7% at this time.

It can be seen from above that, although the AI-based prediction method may use a more efficient modulation format, this method has a failure rate that is much higher than the traditional method. Therefore, to improve the reliability of traffic service of the lightpath, the present application proposed that a protection lightpath is provided in addition to the working lightpath based on 1+1 protection. In order to ensure that upon failure of AI prediction, the lightpath service can be resumed completely, the OSNR margin for the protection lightpath is set by the traditional method. With this method, high spectrum utilization due to more accurate OSNR prediction on the working lightpath is fully utilized, and meanwhile, even if the prediction model fails, the traffic service will not be interrupted since there is a reliable protection lightpath. In FIG. 5, the protection lightpath is arranged on the route A-E-D-C and has an OSNR value of 18.2 dB, in which case the margin is set by the traditional method. Therefore, it can be derived that $FEC_{limit}+U_{margin} \leq 11.5$ dB. As the FEC limit is within the range of [8.38, 12.43] dB, QPSK is selected as the modulation format. At this time, 4 frequency slots need to be reserved on the links A-E, E-D and D-C. In this setting condition, the unallocated margin for the protection lightpath is 3.12 dB, corresponding to a CM value of 9.42 dB. As can be seen from FIG. 4, the failure rate of the protection lightpath is approximately 0.

To evaluate the performance of the proposed protection mechanism, two networks are considered as test networks in the present application, one being 14-node, 21-link NSFNET network, the other being a 24-node, 43-link USNET network. The traffic demand between each node pair is assumed to be uniformly distributed in the range of [100, X] Gb/s, where X is the maximum required traffic capacity, which is 600 and 200 for NSFNET and USNET network respectively. The bandwidth granularity of each frequency slot is 12.5 GHz, then 6 modulation formats, i.e., BPSK, QPSK, 8-QAM, 16-QAM, 32-QAM and 64-QAM are employed as shown in FIG. 6.

First, the working lightpath is set by using the shortest path algorithm. Then, the protection lightpath is adaptively selected by using the most efficient Spectrum Window Plane (SWP)-based algorithm. Three different scenarios are considered in the present application for establishment of the protection lightpath. The first scenario assumes both working and protection lighpaths are set with OSNR margins based on the traditional method. The second scenario sets margins for working lightpath based on the AI-based method, and for protection lightpath based on the traditional method. The third scenario sets margins for both working and protection lightpaths based on the AI-based method.

Figure 7A:
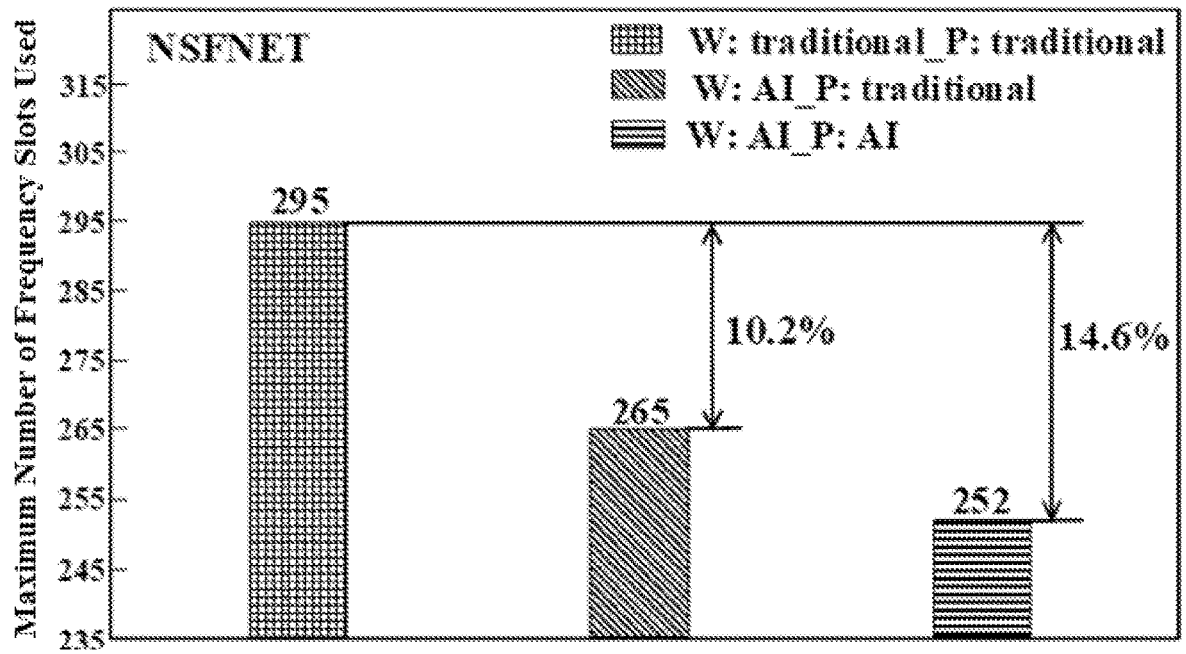
FIG. 7a is the maximum number of frequency slots used in NSFNET according to the present invention.
Figure 7B:
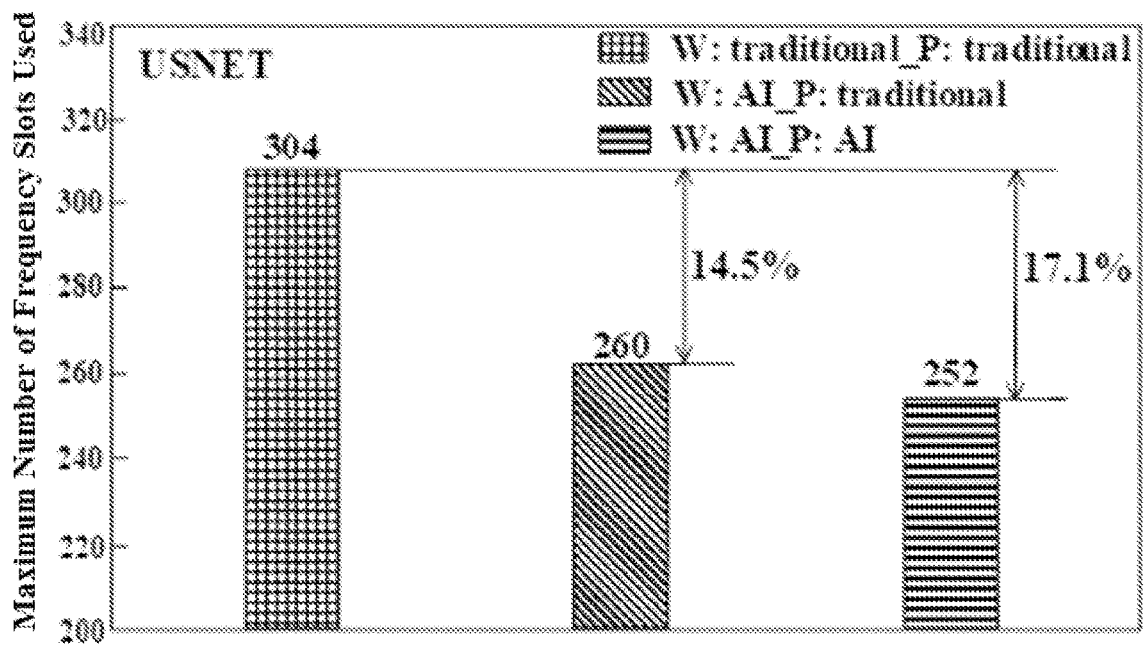
FIG. 7b is the maximum number of frequency slots used in USNET according to the present invention.

In the present application, the number of frequency slots used after serving all the traffic demands is considered, and results are shown in FIGS. 7a and 7b, where "W" represents the working lightpath, "P" represents the protection lightpath, and accordingly "W: AI_P: traditional" represents the AI-based OSNR margin setting for working lightpath and traditional margin setting for protection lightpath. As "W: traditional_P: traditional" sets OSNR margins for both working and protection lightpaths in the traditional way, more spectrum resources are needed in order to meet the traffic demand. Compared with the other two scenarios, the greatest number of frequency slots are used in this scenario. In contrast, because "W: AI_P: AI" employs the AI-based method for both the working lightpath and the protection lightpath, more efficient allocation of spectrum resources can be accomplished, and therefore, the smallest number of frequency slots are used in this scenario. In the medium scenario "W: AI_P: traditional", the number of frequency slots used is between those of the other two scenarios. However, compared with the most efficient scenario "W: AI_P: AI", their difference in the number of frequency slots used is very small. That is, in the most conservative situation for NSFNET and USNET, this number is reduced by 10.2% vs. 14.6%, and 14.5% vs. 17.1% reductions respectively for the scenarios "W: AI_P: traditional" and "W: AI_P: AI".

Figure 8A:
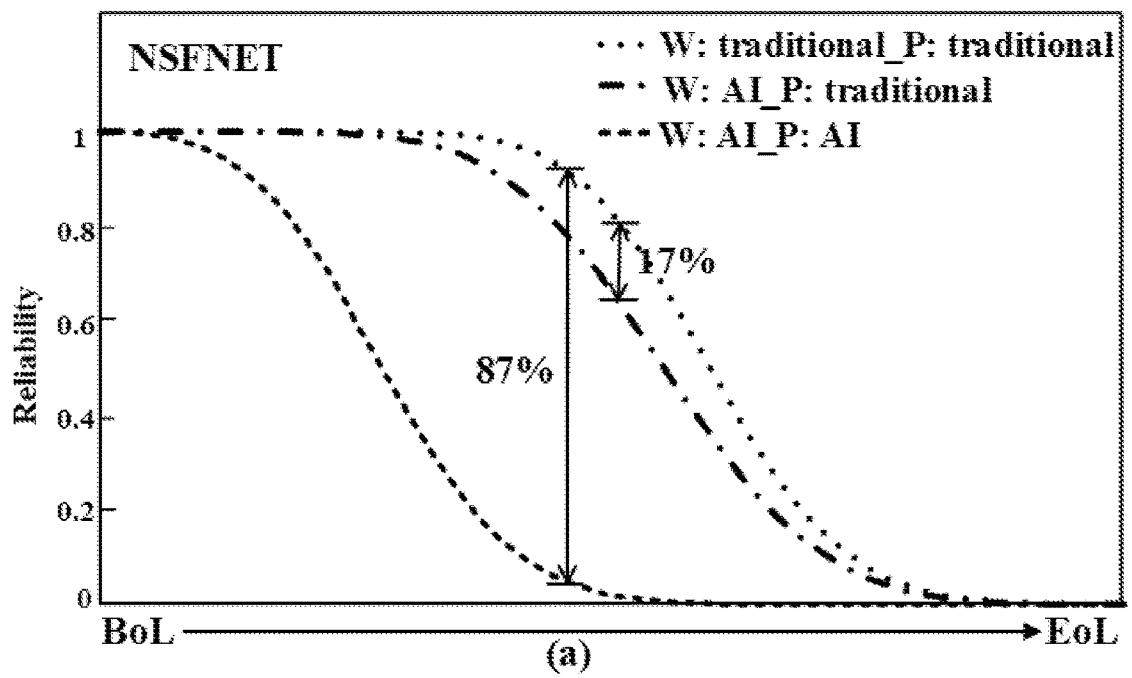
FIG. 8a shows analysis of the reliability of the present invention in NSFNET.
Figure 8B:
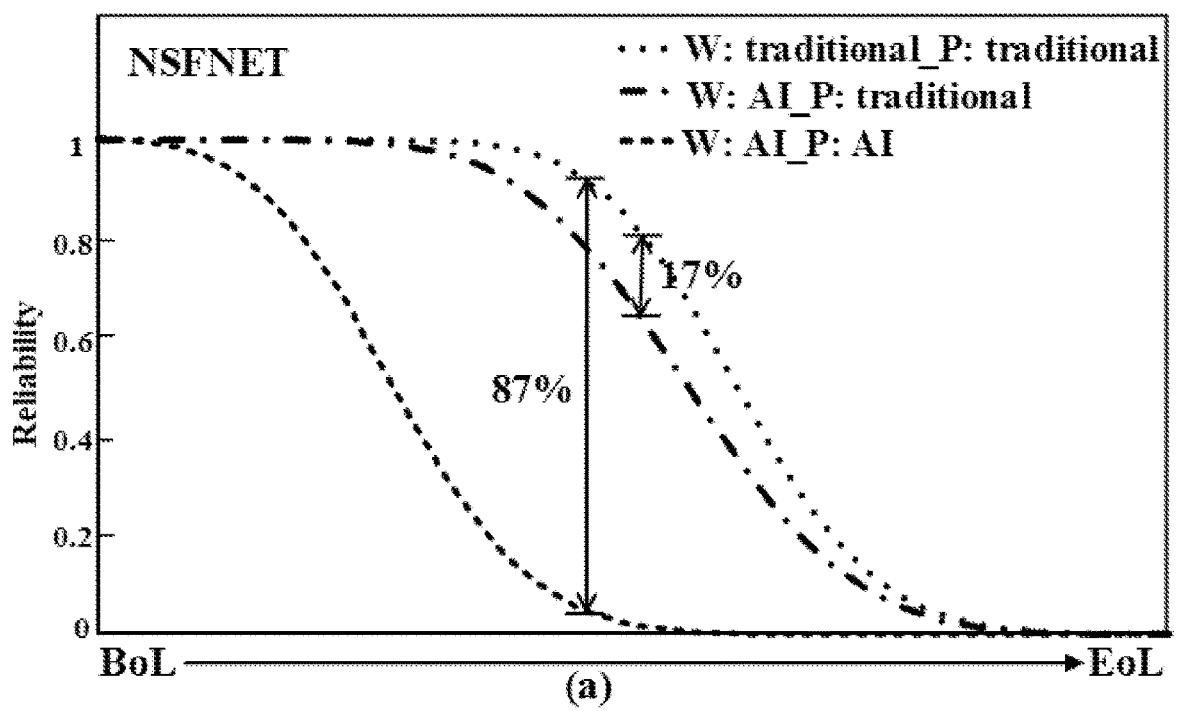
FIG. 8b shows analysis of the reliability of the present invention in USNET.

In addition, in the present application, the reliability of lightpath in the above three scenarios is evaluated. The reliability of lightpath service $R_{lp}$ is calculated in the expression of $R_{lp}=1-F_w \cdot F_p$, where $F_w$ and $F_p$ are respectively the failure rates of the working lightpath and the protection lightpath. In the present application, the reliabilities of all the lightpath services are averaged as the final result as shown in FIGS. 8a and 8b. The scenario "W: traditional_P: traditional" utilizes the most conservative method, and consequently has the highest reliability. On the contrary, the scenario "W: AI_P: AI" utilizes the most advanced prediction method and sets the lowest margins for both the working lightpath and the protection lightpath, and consequently has the lowest reliability. The scenario "W: AI_P: traditional" utilizes the AI-based method for the working lightpath and the traditional method for the protection lightpath and consequently has a medium reliability. In addition, interestingly, although the numbers of frequency slots used in the scenarios "W: AI_P: traditional" and "W: AI_P: AI" are very close, the former scenario has a reliability much higher than the latter. In an NSFNET, the reliability of the scenario "W: AI_P: AI" is lowered by up to 87% and the reliability of the scenario "W: AI_P: traditional" is lowered by merely 17% relative to the scenario "W: traditional_P: traditional". In a USNET, the reliability of the scenario "W: AI_P: AI" is lowered by up to 82% and the reliability of the scenario "W: AI_P: traditional" is lowered by merely 24%. Therefore, it is found that the method for preventing failure of AI-based QoT prediction proposed by the present application can significantly improve the reliability of lightpath service without substantially increasing the use of spectrum resources.

Embodiment 2

On the basis of the same inventive conception, this embodiment provides a protection system against failure of AI-based QoT prediction, which seeks to address the problem on the basis of a similar principle as the protection method against failure of AI-based QoT prediction as describe above. Therefore, detailed description for the same aspects shall be omitted.

The protection system against failure of AI-based QoT prediction according to this embodiment includes a system for allocating an OSNR margin for a working lightpath and a system for allocating an OSNR margin for a protection lightpath.

The system for allocating an OSNR margin for the working lightpath is configured to calculate the first number of frequency slots and the consumable margin for the working lightpath that meet the traffic demand.

The system for allocating an OSNR margin for the protection lightpath is configured to calculate the second number of frequency slots and the consumable margin for the protection lightpath that meet the traffic demand.

The utilization of spectrum resource is evaluated based on the first number of frequency slots and the second number of frequency slots, and the reliability of lightpath is evaluated based on the consumable margin for the working lightpath.

The present application is described with reference to flowcharts and/or block diagrams of methods, devices (systems), and computer program products according to embodiments of the present application. It is understood that each flow and/or block in the flowchart and/or block diagram, and combinations of flows and/or blocks in the flowchart and/or block diagram can be implemented by computer program instructions. These computer program instructions may be provided to a processor of a general purpose computer, a special purpose computer, an embedded processor or another programmable data processing device to produce a machine, such that the instructions executed by the processor of the computer or another programmable data processing device produce means for implementing the functions specified in one or more flows in a flow diagram and/or one or more blocks in a block diagram.

These computer program instructions may also be stored in a computer-readable memory that can direct a computer or another programmable data processing device to operate in a specific manner, such that the instructions stored in the computer-readable memory produce an article of manufacture including a command device that implement the functions specified in one or more flows in a flow diagram and/or one or more blocks in a block diagram.

These computer program instructions may also be loaded onto a computer or another programmable data processing device, such that a series of operational steps are performed on the computer or another programmable device to produce a computer-implemented process, such that the instructions which execute on the computer or another programmable device provide steps for implementing the functions specified in one or more flows in a flow diagram and/or one or more blocks in a block diagram.

Obviously, the above embodiments are only examples for clear explanation, and are not intended to limit the implementation. For those of ordinary skill in the art, other changes or variations in different forms can be made on the basis of the above description. It is not necessary and not possible to list all the embodiments exhaustively herein. Obvious changes or variations derived therefrom shall fall within the scope of protection of the present invention.

What is claimed is:

1. A protection method against failure of artificial-intelligence-based (AI-based) quality-of-transmission (QoT) prediction, comprising a method for allocating an Optical Signal to Noise Ratio (OSNR) margin for a working lightpath and a method for allocating an OSNR margin for a protection lightpath, wherein
a first number of frequency slots and a consumable margin for the working lightpath that meet the traffic demand are calculated according to the method for allocating an OSNR margin for the working lightpath;
a second number of frequency slots and a consumable margin for the protection lightpath that meet the traffic demand are calculated according to the method for allocating an OSNR margin for the protection lightpath; and
utilization of spectrum resource is evaluated based on the first number of frequency slots and the second number of frequency slots, and reliability of lightpath is evaluated based on the consumable margin for the working lightpath.

2. The protection method against failure of AI-based QoT prediction of claim 1, wherein the reliability of lightpath service is evaluated based on both the consumable margin for the working lightpath and the consumable margin for the protection lightpath.

3. The protection method against failure of AI-based QoT prediction of claim 1, wherein the utilization of lightpath is evaluated based on both the first number of frequency slots and the second number of frequency slots.

4. The protection method against failure of AI-based QoT prediction of claim 1, wherein the reliability of lightpath service is calculated in the expression of $R_{lp}=1-F_w \cdot F_p$, where $F_w$ and $F_p$ are respectively the failure rate of the working lightpath and the failure rate of the protection lightpath.

5. The protection method against failure of AI-based QoT prediction of claim 1, wherein the method for allocating an OSNR margin for a working lightpath comprises calculating the OSNR of the lightpath by using channel parameters; during signal transmission, increasing the error value by one random Gaussian distribution each time passing through a link to produce real actual data through simulation; building an OSNR model through artificial neural network training to predict the OSNR of the lightpath; and calculating the first number of frequency slots and the consumable margin for the working lightpath that meet the traffic demand based on the OSNR.

6. The protection method against failure of AI-based QoT prediction of claim 5, wherein the channel parameters include the number of hops of the lightpath, the total length of the lightpath, the length of the longest link of the lightpath, total amplified spontaneous emission noises of all the lightpaths, total non-linear interferences of all the lightpaths, and the number of optical amplifiers on the lightpath.

7. The protection method against failure of AI-based QoT prediction of claim 1, wherein the first number of frequency slots and the consumable margin for the working lightpath are calculated in the expressions of $$FEC_{limit} + U_{margin} \leq OSNR_{lightpath} - S_{margin} = OSNR_{lightpath} - 4.7 \text{ dB}$$

$$U_{margin} \leq OSNR_{lightpath} - 4.7 \text{ dB} - FEC_{limit}$$

where $FEC_{limit}$ is the forward error correction coding limit, $U_{margin}$ and $S_{margin}$ are respectively unallocated margins and system margins, and $OSNR_{lightpath}$ is the OSNR value of the lightpath.

8. The protection method against failure of AI-based QoT prediction of claim 1, wherein the method for allocating an OSNR margin for the protection lightpath comprises: calculating the OSNR of the lightpath by using the channel parameters; and calculating the second number of frequency slots and the consumable margin for the protection lightpath that meet the traffic demand based on the OSNR.

9. The protection method against failure of AI-based QoT prediction of claim 1, wherein the second number of frequency slots and the consumable margin for the protection lightpath are calculated in the expressions of $$FEC_{limit} + U_{margin} \leq OSNR_{lightpath} - D_{margin} - S_{margin} = OSNR_{lightpath} - 6.7 \text{ dB}$$

$$U_{margin} \leq OSNR_{lightpath} - 6.7 \text{ dB} - FEC_{limit}$$

where $FEC_{limit}$ is the forward error correction coding limit, $U_{margin}$, $D_{margin}$ and $S_{margin}$ are respectively unallocated margins, design margins and system margins, and $OSNR_{lightpath}$ is the OSNR value of the lightpath.

10. A protection system against failure of AI-based QoT prediction, comprising a system for allocating an OSNR margin for the working lightpath and a system for allocating an OSNR margin for the protection lightpath, wherein the system for allocating an OSNR margin for the working lightpath is configured to calculate a first number of frequency slots and a consumable margin for the working lightpath that meet the traffic demand;

the system for allocating an OSNR margin for the protection lightpath is configured to calculate a second number of frequency slots and a consumable margin for the protection lightpath that meet the traffic demand; and utilization of spectrum resource is evaluated based on the first number of frequency slots and the second number of frequency slots, and reliability of lightpath is evaluated based on the consumable margin for the working lightpath.

\* \* \* \* \*